(12) United States Patent
Gray et al.

(10) Patent No.: US 11,682,303 B1
(45) Date of Patent: *Jun. 20, 2023

(54) PARKING MANAGEMENT SYSTEMS AND METHODS

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Qunying Kou, San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge Lecocke, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,665

(22) Filed: Feb. 16, 2022

Related U.S. Application Data

(63) Continuation of application No. 16/778,919, filed on Jan. 31, 2020, now Pat. No. 11,436,924.

(60) Provisional application No. 62/799,452, filed on Jan. 31, 2019.

(51) Int. Cl.
*G08G 1/14* (2006.01)
*G06Q 40/08* (2012.01)

(52) U.S. Cl.
CPC ............. *G08G 1/143* (2013.01); *G06Q 40/08* (2013.01)

(58) Field of Classification Search
CPC .............................. G08G 1/143; G06Q 40/08
See application file for complete search history.

(56) References Cited

U.S. PATENT DOCUMENTS

| | | | |
|---|---|---|---|
| 2014/0285361 A1* | 9/2014 | Tippelhofer | G08G 1/143 340/932.2 |
| 2014/0350855 A1* | 11/2014 | Vishnuvajhala | G07C 1/30 701/538 |
| 2015/0248835 A1* | 9/2015 | Aravkin | G08G 1/146 340/932.2 |
| 2017/0118307 A1* | 4/2017 | Beaurepaire | G08G 1/144 |

(Continued)

*Primary Examiner* — Sisay Yacob

(74) *Attorney, Agent, or Firm* — Fletcher Yoder, P.C.

(57) ABSTRACT

A vehicle parking management system includes one or more processors configured to receive data indicative of one or more characteristics of one or more parking locations. The one or more processors is also configured to determine one or more recommended parking locations of the one or more parking locations based on the data and based on an input related to a vehicle. The one or more processors is further configured to output a recommendation of the one or more recommended parking locations via a display screen to a driver of the vehicle.

20 Claims, 2 Drawing Sheets

(56) References Cited

U.S. PATENT DOCUMENTS

2018/0218605 A1* 8/2018 Mowatt .................. G08G 1/144
2021/0019671 A1* 1/2021 Cao .................... G06Q 30/0283

* cited by examiner

US 11,682,303 B1

PARKING MANAGEMENT SYSTEMS AND METHODS

CROSS-REFERENCE TO RELATED APPLICATIONS

This application is a Continuation of U.S. patent application Ser. No. 16/778,919, entitled "PARKING MANAGEMENT SYSTEMS AND METHODS," filed Jan. 31, 2020, which claims priority to U.S. Provisional Application Ser. No. 62/799,452, entitled "PARKING MANAGEMENT SYSTEMS AND METHODS," filed Jan. 31, 2019, each of which are hereby incorporated by reference in their entirety for all purposes.

BACKGROUND

The present disclosure relates generally to parking management systems and methods.

A driver of a vehicle may park the vehicle in a parking location (e.g., a parking space, a parking lot) at a destination. The driver may choose to park the vehicle in the parking location based on the parking location's convenience or proximity to an entrance to the destination. In some cases, the driver may also visually assess characteristics (e.g., lighting) of the parking location and may choose to park the vehicle in the parking location based on such characteristics.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

In one embodiment, a vehicle parking management system includes one or more processors configured to receive data indicative of one or more characteristics of one or more parking locations. The one or more processors is also configured to determine one or more recommended parking locations of the one or more parking locations based on the data and based on an input related to a vehicle. The one or more processors is further configured to output a recommendation of the one or more recommended parking locations via a display screen to a driver of the vehicle.

In one embodiment, a vehicle parking management system includes one or more processors configured to receive data indicative of one or more characteristics of one or more parking locations. The one or more processors is configured to receive at least some of the data from a sensor coupled to a vehicle. The one or more processors is also configured to determine one or more recommended parking locations of the one or more parking locations based on the data. The one or more processors is further configured to output a recommendation of the one or more recommended parking locations via a display screen to a driver of the vehicle.

In one embodiment, a method of operating a vehicle parking management system includes receiving data indicative of one or more characteristics of one or more parking locations at one or more processors. The method also includes determining one or more recommended parking locations of the one or more parking locations based on the data and an input related to a vehicle using the one or more processors. The method further includes instructing display of a recommendation of the one or more recommended parking locations via a display screen to a driver of the vehicle using the one or more processors.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A driver of a vehicle may park the vehicle in a parking location (e.g., a parking space, a parking lot) at a destination. While the driver may be able to visually assess some characteristics (e.g., lighting) of the parking location, the driver may not be aware of other characteristics of the parking location, such as prior incidents (e.g., criminal incidents, such as theft of vehicles or objects within vehicles at the parking location; collisions or damage incurred by vehicles at the parking location). Additionally, the driver may not be aware of other nearby parking locations and/or characteristics (e.g., lighting, prior incidents) of the other nearby parking locations. Accordingly, the present embodiments relate generally to a vehicle parking management system that may collect data related to characteristics of various parking locations, provide information about the characteristics of a selected parking location within which the vehicle is parked or will be parked to the driver, and/or provide information about the characteristics of other nearby parking locations to the driver. The vehicle parking management system may additionally or alternatively determine one or more recommended parking locations based on the characteristics of the various parking locations, provide a recommendation of the one or more recommended parking locations to the driver, and/or provide an incentive (e.g., adjustment to an insurance rate, such as an insurance rate for the vehicle) to the driver in response to the driver selecting and parking the vehicle in one of the one or more recommended parking locations.

Figure 1:
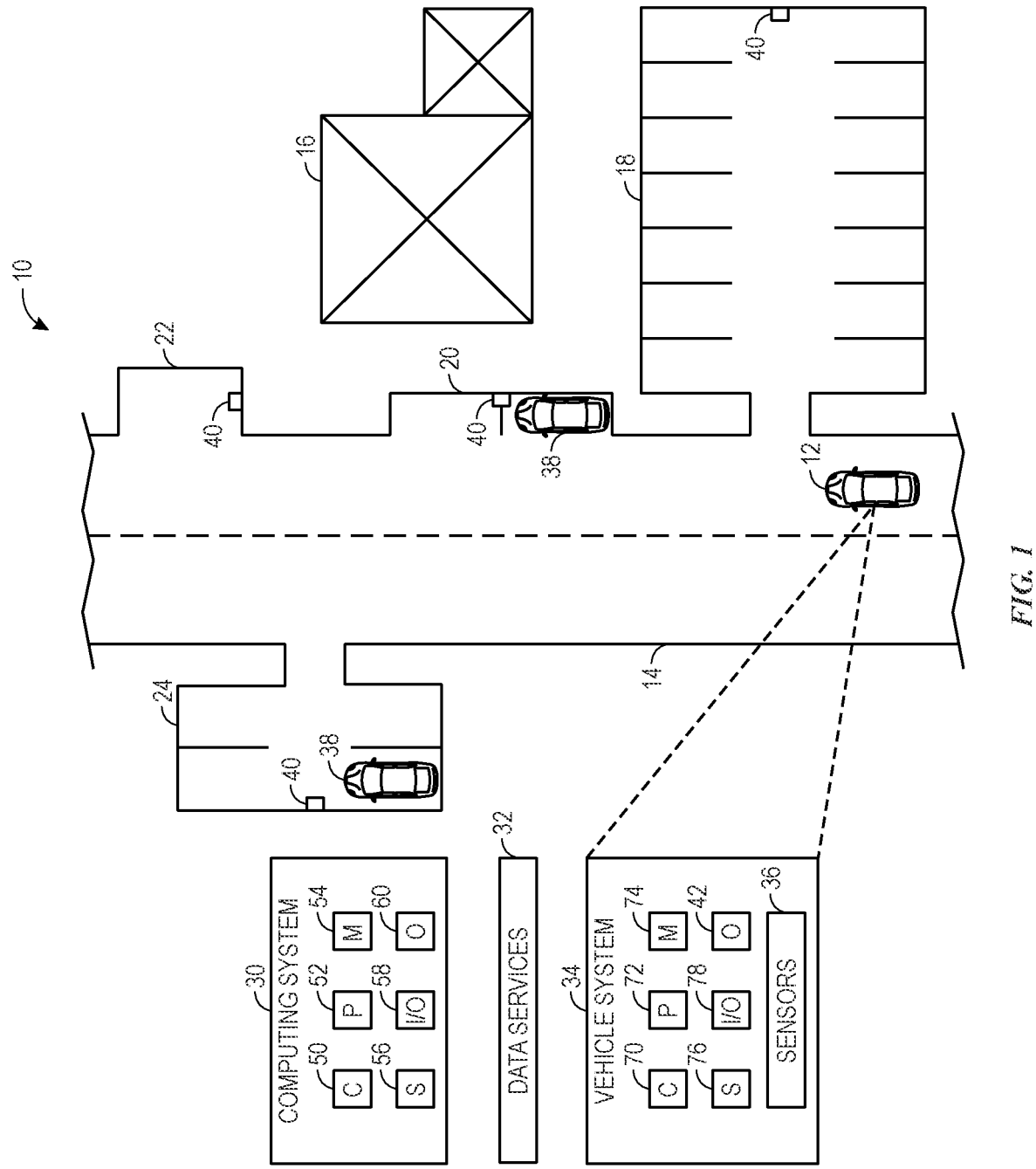
FIG. 1 illustrates a schematic diagram of a vehicle parking management system that is configured to provide information related to one or more parking locations to a driver of a vehicle, in accordance with embodiments described herein.

With the foregoing in mind, FIG. 1 illustrates a schematic diagram of a vehicle parking management system 10 that is configured to provide information related to one or more parking locations to a driver of a vehicle 12. As shown, the driver of the vehicle 12 may drive the vehicle 12 along a road 14 toward a destination 16. Various parking locations may be present near the destination 16. For example, a first parking location 18, a second parking location 20, a third parking location 22, and a fourth parking location 24 may be present near the destination 16. It should be appreciated that the parking locations described herein may be parking lots with multiple parking spaces and/or may be individual parking spaces (e.g., within parking lots or along the road 14). Thus, the vehicle parking management system 10 may be configured to provide information for parking lots as a whole and/or for individual parking spaces.

The driver may select and park the vehicle 12 at one of the various parking locations (e.g., a selected parking location). As noted above, while the driver may be able to visually assess some characteristics (e.g., lighting) of the selected parking location, the driver may not be aware of other characteristics of the selected parking location, such as prior incidents (e.g., criminal incidents, such as theft of vehicles or objects within vehicles at the selected parking location; collisions or damage incurred by vehicles at the selected parking location). Additionally, the driver may not be aware of the other nearby parking locations and/or characteristics (e.g., lighting, prior incidents) of the other nearby parking locations.

Accordingly, the vehicle parking management system 10 may assist the driver with parking the vehicle 12. As shown, the vehicle parking management system 10 may include a computing system 30 (e.g., vehicle parking computing system), one or more databases or data services 32, and a vehicle system 34 (e.g., vehicle monitoring system or vehicle control system). In operation, the computing system 30 may receive data indicative of the characteristics of the one or more parking locations from any of a variety of sources, such as from the one or more databases or data services 32, one or more sensors 36 on the vehicle 12 and/or on other vehicles 38, and/or one or more sensors 40 at the various parking locations. The characteristics may include, but are not limited to, prior criminal incidents, prior collisions or damage, current weather conditions (e.g., wind, hail, flooding/water levels), current events (e.g., active criminal events, such as suspected criminals loose in the vicinity; current collisions), current pricing, current availability, and/or lighting conditions.

In some embodiments, the computing system 30 may receive data indicative of prior criminal incidents from a local crime data service and/or data indicative of prior collisions or damage from an insurance claims data service. The computing system 30 may receive data indicative of current weather conditions from a weather data service and/or data indicative of current events from a news data service. The computing system 30 may receive data indicative of current availability, current pricing, and/or lighting conditions for each parking location from a parking data service. The one or more databases or data services 32 may include electronic news sources that may be updated in real time or near real time (e.g., news websites, social media websites) and/or information collection organizations that acquire data. The computing system 30 may receive certain data, such as data indicative of current weather conditions, data indicative of current events, data indicative of current availability, and/or data indicative of the lighting conditions via one or more sensors (e.g., the one or more sensors 36 on the vehicle 12 and/or on other vehicles 38; the one or more sensors 40 at the various parking locations). The one or more sensors 36, 40 may include any of a variety of sensors, such as imaging sensors (e.g., cameras) or optical sensors capable of obtaining images and/or detecting light levels, for example. The computing system 30 may receive and/or process the data continuously, receive and/or process the data periodically (e.g., hourly), and/or may receive and/or process the data in response to certain events and/or based on any of a variety of inputs related to the vehicle 12 (e.g., the vehicle 12 reached the selected parking location, the driver plans to travel in the vehicle 12 to a destination.

The computing system 30 may process the data (e.g., using one or more algorithms) to rank the various parking locations (e.g., relative to one another). For example, the first parking location 18 may be ranked higher than the second parking location 20 if the first parking location 18 has a lower number and/or severity of prior criminal incidents, if the first parking location 18 has a lower number and/or severity of prior collisions or damage, and/or if the first parking location 18 has better lighting conditions. Additionally or alternatively, the computing system 30 may process the data (e.g., using one or more algorithms) to calculate a respective score (e.g., numerical score) for each of the various parking locations. For example, each characteristic of the first parking location 18 may be assigned a score (e.g., 6 out of 10 for prior criminal incidents, 7 out of 10 for prior collisions or damage, 8 out of 10 for lighting conditions), and these scores may then be combined (e.g., median, average, weighted average) to calculate a total score for the first parking location 18. In some embodiments, the score may generally reflect a risk profile associated with the parking location (e.g., risk of damage to the vehicle 12). The rank and/or scores may vary based on the time of day. For example, the first parking location 18 may be ranked higher than the second parking location 20 in the morning, while the second parking location 20 may be ranked higher than the first parking location 18 in the evening. The computing system 30 may determine the time-dependent rank and/or the scores based on the received data (including timing data, such as a time of day of prior criminal incidents, a time of day of prior collisions or damage, and the like) and output the appropriate rank and/or scores based on the current time of day or the time at which the vehicle 12 will be parked at one of the parking locations.

Additionally or alternatively, the computing system 30 may process the data (e.g., using one or more algorithms) to determine one or more recommended parking locations. In some embodiments, the computing system 30 may determine the one or more recommended parking locations based on the rank and/or the total score of each of the nearby parking locations. The nearby parking locations may include the selected parking location in which the vehicle 12 is currently parked or will be parked, other parking locations on the same road 14, other parking locations within a certain distance of the selected parking location in which the vehicle 12 is currently parked or will be parked, and/or other parking locations within a certain distance of the destination 16. For example, in the illustrated embodiment, the nearby parking locations may include the first parking location 18, the second parking location 20, the third parking location 22, and the fourth parking location 24 proximate to the destination 16. The computing system 30 may process the data to rank the various parking locations and/or to determine the one or more recommended parking locations continuously, periodically (e.g., hourly), and/or in response to certain events and/or based on any of a variety of inputs related to the vehicle 12 (e.g., the vehicle 12 reached the selected parking location, the driver plans to travel in the vehicle 12 to a destination.

To assist the driver in parking the vehicle 12, the computing system 30 may provide an output to the driver of the vehicle 12 (e.g., via an output device 42 of the vehicle system 34). The output may include information indicative of the characteristics of the selected parking location, information indicative of the characteristics of one or more nearby parking locations, and/or a recommendation of the one or more recommended parking locations. In some embodiments, the computing system 30 may provide the output in response to detection of the vehicle 12 at the selected parking location. For example, in operation, the computing system 30 may monitor the location of the vehicle 12 (e.g., via global positioning system coordinates received from the one or more sensors 36 of the vehicle 12). The computing system 30 may compare the location of the vehicle 12 to known parking locations to determine that the vehicle 12 is at a particular parking location (e.g., the selected parking location), and then the computing system 30 may provide the output (e.g., via the output device 42 of the vehicle system 34). In some embodiments, the computing system 30 may provide the output in response to determining that the vehicle 12 is stationary or in a parked position at the particular parking location (e.g., based on data from the one or more sensors 36 of the vehicle 12 that indicates that the vehicle 12 is stationary or in the parked position at the particular parking location).

It should be appreciated that the output may additionally or alternatively be provided to the driver at the beginning of a driving trip to the destination 16 (e.g., in response to an input of the destination 16 or the selected parking location at the vehicle system 34 or at a separate device, such as a mobile phone or tablet). The vehicle 12 may be an autonomous vehicle, and the computing system 30 may instruct the vehicle system 34 to autonomously drive the vehicle 12 to one of the one or more recommended parking locations, such as the nearby parking location with the highest rank or score.

In some embodiments, the computing system 30 may determine and/or provide an incentive for parking the vehicle 12 in one of the one or more recommended parking locations. The incentive may relate to an adjustment to an insurance rate (e.g., an insurance rate for the vehicle 12, such as a monthly premium to insure the vehicle 12). For example, the insurance rate may be decreased if the driver parks the vehicle 12 in one of the one or more recommended parking locations. Furthermore, in some embodiments, the insurance rate may be increased if the driver parks the vehicle 12 in a parking location other than one of the one or more recommended parking locations. Additionally or alternatively, in some embodiments, the incentive may vary with the rank and/or the score for the parking location. For example, if the vehicle 12 remains parked in a parking location that is not one of the recommended parking locations, the insurance rate is not adjusted; if the vehicle 12 parks in a parking location with a score of 5 out of 10, the insurance rate will be decreased by a first amount; and/or if the vehicle 12 parks in a parking location with a score of 8 out of 10, the insurance rate will be decreased by a second amount greater than the first amount.

The incentive may vary based on other data, such as the current price of the one or more recommended parking lots.

For example, the incentive may be greater than the current price of the one or more recommended parking lots and/or greater than a difference between the current price of the selected parking lot and the current price of the one or more recommended parking lots (e.g., to make up for any money that would be lost to the driver due to moving to the one or more recommended parking lots). In some embodiments, the incentive may vary with time (e.g., dollars per minutes, hours, or days). For example, if the vehicle 12 is parked in one of the one or more recommended parking locations for one hour, the insurance rate may be decreased by a first amount. However, if the vehicle 12 is parked in one or the one or more recommended parking locations for five hours, the insurance rate may be decreased by a second amount that is greater than (e.g., five times greater than) the first amount. It should be appreciated that other incentives, such as rewards points, cash back, and the like, may be provided in addition to or as an alternative to the adjustment to the insurance rate. Further, disincentives may also be applied instead of or in combination with incentives. For example, insurance rates may go up proportionally or exponentially based on an amount of time spent in a disfavored or lower ranked parking location.

The computing system 30 may provide an indication related to the incentive to the driver of the vehicle 12. For example, the output provided to the driver of the vehicle 12 (e.g., via the output device 42 of the vehicle system 34) may include information related to the incentive, such as the adjustment to the insurance rate that would be provided in response to parking the vehicle 12 in one of the one or more recommended parking locations. Any of the outputs disclosed herein may be provided to the driver via the output device 42 of the vehicle system 34 and/or via a separate device, such as a mobile phone or tablet.

Components of the computing system 30 may be located at any suitable location, including within the vehicle 12 or at a remote location. The computing system 30 may include or be part of a supercomputer that utilizes multiple computing systems, a cloud computing system, or the like, and it should be understood that all or some of the processing functions described herein with respect to the computing system 30 may be carried out by the vehicle system 34, any other suitable computing system, or a combination of such systems.

The computing system 30 may include certain components to facilitate the disclosed techniques. For example, the computing system 30 may include a communication component 50, a processor 52, a memory 54, a storage 56, input/output (I/O) ports 58, and/or an output device 60 (e.g., a display or a speaker). The communication component 50 may be a wireless or wired communication component that may facilitate communication with the one or more databases or data services 32, the vehicle system 34, and/or separate devices (e.g., a mobile phone or tablet). In the illustrated embodiment, the memory 54 stores code executable by the processor 52 to perform operations and method steps in accordance with the present embodiments.

The processor 52 may be any suitable type of computer processor or microprocessor capable of executing computer-executable code. The processor 52 may also include multiple processors that may perform the operations described herein. The memory 54 and the storage 56 may be any suitable articles of manufacture that can serve as media to store processor-executable code, data, or the like. These articles of manufacture may represent non-transitory computer-readable media (e.g., any suitable form of memory or storage) that may store the processor-executable code used by the processor 52 to perform the presently disclosed techniques. The memory 54 and the storage 56 may also be used to store the data, various other software applications, and the like. It should be noted that non-transitory merely indicates that the media is tangible and not a signal.

The I/O ports 58 may be interfaces that may couple to other peripheral components such as input devices (e.g., keyboard, mouse), sensors, input/output (I/O) modules, and the like. The output device 60 may operate to depict indications associated with software or executable code processed by the processor 52. In one embodiment, the output device 60 may be an input device. For example, the output device 60 may include a touch display capable of receiving inputs from a user of the computing system 30. The output device 60 may be any suitable type of display, such as a liquid crystal display (LCD), plasma display, or an organic light emitting diode (OLED) display, for example. It should be noted that the components described above with regard to the computing system 30 are exemplary components and the computing system 30 may include additional or fewer components.

Similarly, the vehicle system 34 may include certain components to facilitate the disclosed techniques. For example, the vehicle system 34 may include a communication component 70, a processor 72, a memory 74, a storage 76, input/output (I/O) ports 78, and/or the output device 42 (e.g., a display or a speaker). It should be noted that the components described above with respect to the vehicle system 34 may have any of the features of corresponding components of the computing system 30. For example, the output device 42 may be an input device.

Figure 2:
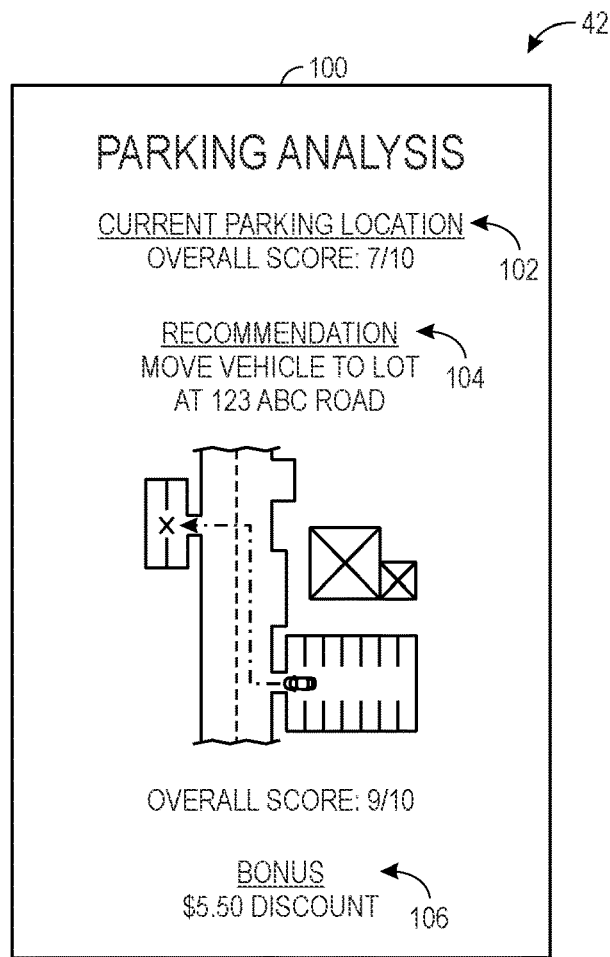
FIG. 2 illustrates information that may be provided by the vehicle parking management system of FIG. 1 on a display screen, in accordance with embodiments described herein.

FIG. 2 illustrates information that may be provided as the output by the vehicle parking management system 10 to the driver of the vehicle 12. For example, the output device 42 may include a display screen 100 (e.g., graphical user interface) within the vehicle 12, such as in a console of the vehicle 12. Upon entering or parking at the selected parking location (e.g., the first parking location 18), the vehicle system 34 may receive information from the computing system 30 and instruct the output device 42 to provide the output.

As shown, the output may include a first portion 102 that lists characteristics of the selected parking location, such as a total score for the selected parking location. The first portion 102 may list or provide a link to enable the driver to access separate scores for each characteristic of the selected parking location (e.g., 6 out of 10 for prior criminal incidents, 7 out of 10 for prior collisions or damage, 8 out of 10 for lighting conditions). In addition to or as an alternative to score(s), the first portion 102 may include details or a link to enable the driver to access details about the characteristics, such as a written description with dates and times of prior criminal incidents. As noted above, the characteristics may include, but are not limited to, prior criminal incidents, prior collisions or damage, current weather conditions, current events, current pricing, current availability, and/or lighting conditions.

As shown, the output may include a second portion 104 with a recommendation of one or more recommended parking locations. The second portion 104 may indicate the location of the one or more recommended parking locations and/or list characteristics of each of the one or more recommended parking locations and/or nearby parking locations, such as a total score for each of the one or more recommended parking locations and/or nearby parking locations. In some embodiments, the second portion 104 may list or provide a link to enable the driver to access separate scores for each characteristic of the one or more recommended parking locations and/or nearby parking locations. In addition to or as an alternative to score(s), the second portion 104 may include details or a link to enable the driver to access details about the characteristics of the one or more recommended parking locations and/or nearby parking locations. As noted above, the characteristics may include, but are not limited to, prior criminal incidents, prior collisions or damage, current weather conditions, current events, current pricing, current availability, and/or lighting conditions. The second portion 104 may include a map of the one or more recommended parking locations and/or nearby parking locations. The map may include a route to the one or more recommended parking locations from a current location of the vehicle 12.

As shown, the output may include a third portion 106 with an indication of an incentive that may be provided to the driver for parking in one of the one or more recommended parking locations. For example, the incentive may be a discount (e.g., fixed amount or amount per unit time) that will be applied to an insurance rate should the driver park the vehicle 12 in one of the one or more recommended parking locations. The output shown in FIG. 2 is merely exemplary and any of a variety of other information may additionally or alternatively be provided to the driver to facilitate parking the vehicle 12 in accordance with the techniques disclosed herein. Some or each of the portions 102, 104, 106 may be provided on separate screens or in other formats, and the output may be provided on a separate device, such as a mobile phone or a tablet.

Figure 3:
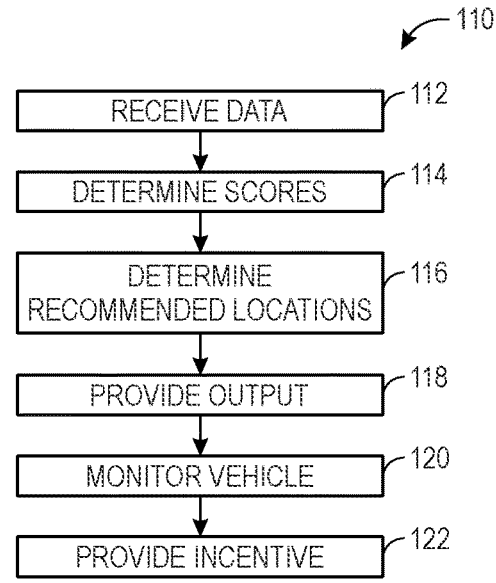
FIG. 3 illustrates a flow chart of a method of operating the vehicle parking management system of FIG. 1, in accordance with embodiments described herein.

FIG. 3 illustrates a flow chart of a method for providing information using the vehicle parking management system of FIG. 1, in accordance with embodiments described herein. The following description of the method 110 will be described as being performed by the computing system 30, but it should be noted that any suitable processor-based device may be specially programmed to perform any of the steps of the methods described herein. Moreover, although the following description of the method 110 is described in a particular order, it should be understood that the steps of the method 110 may be performed in any suitable order, certain steps of the method 110 may be omitted, and other steps may be added to the method 110.

At block 112, the computing system 30 may receive data related to one or more parking locations, such as prior criminal incidents, prior collisions or damage, current weather conditions, current events, current pricing, current availability, and/or lighting conditions. The computing system 30 may also receive data indicative of a current location of the vehicle 12, a target destination of the vehicle 12, and/or a selected parking location for the vehicle 12. As discussed above, the data may be acquired via the one or more databases and/or data services 32 and/or one or more sensors (e.g., the one or more sensors 36 of the vehicle 12 and/or other vehicles 38; the one or more sensors 40 at the parking locations).

At block 114, the computing system 30 may determine respective scores for various parking locations (e.g., nearby parking locations, such as the selected parking location in which the vehicle 12 is currently parked or will be parked, other parking locations on the same road 14, other parking locations within a certain distance of the selected parking location in which the vehicle 12 is currently parked or will be parked, and/or other parking locations within a certain distance of the destination 16) using the data. Additionally or alternatively, the computing system 30 may determine a rank of the various parking locations and/or one or more recommended parking locations using the data. For example, as shown in block 116, the computing system 30 may determine the one or more recommended parking locations using the data (e.g., using the scores and/or the rank).

At block 118, the computing system 30 may provide an output to the driver of the vehicle 12 (e.g., via an output device 42 of the vehicle system 34). The output may include information indicative of the characteristics of the selected parking location, information indicative of the characteristics of one or more nearby parking locations, a recommendation of the one or more recommended parking locations, and/or an incentive that may be provided for parking the vehicle 12 in one of the one or more recommended parking locations.

At block 120, the computing system 30 may monitor the location of the vehicle 12 (e.g., via the one or more sensors 40) to determine that the vehicle 12 is parked within one of the one or more recommended parking locations. In block 122, upon determining that the vehicle 12 is parked within one of the one or more recommended parking locations, the computing system 30 may apply the incentive (e.g., adjust the insurance rate for the vehicle 12).

The systems and methods in accordance with the present disclosure efficiently and effectively provide information regarding various parking locations and incentives (e.g., insurance rates) to the driver. By considering current data and/or prior data related to various parking locations, the disclosed systems and methods may reduce the risk of damage to the vehicle 12 and/or provide appropriate insurance rates for the vehicle 12. Further, present embodiments may improve overall performance of an insurance monitoring system (e.g., computer network) by providing accurate and essentially real-time data related to risk associated with parking habits.

Examples provided herein, including one or more examples provided within parentheses, are provided to facilitate discussion and are not intended to be limiting. While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method of operating a vehicle parking management system, the method comprising:
   receiving, at a processor, data indicative of prior incidents associated with one or more respective parking locations of a plurality of parking locations;
   determining, using the processor, one or more recommended parking locations of the plurality of parking locations based on the data; and
   instructing, using the processor, display of a recommendation of the one or more recommended parking locations via a display screen.

2. The method of claim 1, comprising:
   receiving, at the processor, an input indicative of a destination for a driving trip of a vehicle; and
   identifying, using the processor, the one or more recommended parking locations that are near the destination.

3. The method of claim 1, wherein the prior incidents comprise prior criminal incidents, prior collisions, or both.

4. The method of claim 1, comprising initiating, using the processor, a decrease in an insurance rate for a vehicle in response to the vehicle being parked in one of the one or more recommended parking locations.

5. A vehicle parking management system, comprising:
   a processor; and
   a memory, accessible by the processor, the memory storing instructions that, when executed by the processor, cause the processor to perform operations comprising:
   receiving data indicative of prior incidents associated with one or more respective parking locations of a plurality of parking locations;
   determining one or more recommended parking locations of the plurality of parking locations based on the data; and
   output a recommendation of the one or more recommended parking locations via a display screen.

6. The vehicle parking management system of claim 5, wherein the operations comprise receiving an input indicative of a destination for a driving trip of a vehicle, and the one or more recommended parking locations are near the destination.

7. The vehicle parking management system of claim 6, wherein the operations comprise determining the one or more recommended parking locations and outputting the recommendation in response to receipt of the input.

8. The vehicle parking management system of claim 6, wherein the input comprises additional data indicative of the vehicle reaching one of the plurality of parking locations.

9. The vehicle parking management system of claim 5, wherein the display screen is part of a vehicle.

10. The vehicle parking management system of claim 5, wherein the operations comprise receiving additional data indicative of current environmental conditions associated with the one or more respective parking locations of the plurality of parking locations.

11. The vehicle parking management system of claim 10, wherein the current environmental conditions comprise lighting conditions, weather conditions, or both.

12. The vehicle parking management system of claim 10, wherein the additional data comprises sensor data from one or more sensors on one or more vehicles, and the sensor data is indicative of the current environmental conditions.

13. The vehicle parking management system of claim 5, wherein the prior incidents comprise prior criminal incidents, prior collisions, or both.

14. The vehicle parking management system of claim 5, wherein the operations comprise outputting a map of a route to the one or more recommended parking locations via the display screen.

15. The vehicle parking management system of claim 5, wherein the operations comprise decreasing an insurance rate for a vehicle in response to the vehicle being parked in one of the one or more recommended parking locations.

16. The vehicle parking management system of claim 5, wherein the operations comprise calculating a respective score for each of the plurality of parking locations based on the data and determining the one or more recommended parking locations based on the respective score for each of the plurality of parking locations.

17. A vehicle parking management system, comprising:
   a processor; and
   a memory, accessible by the processor, the memory storing instructions that, when executed by the processor, cause the processor to perform operations comprising:
   receiving data indicative of prior incidents associated with a plurality of parking locations;

receiving an input indicative of a vehicle being located at a first parking location of the plurality of parking locations; and in response to receipt of the input, outputting an indication of respective prior incidents associated with the first parking location via a display screen.

18. The vehicle parking management system of claim 17, wherein the operations comprise:

determining a first score for the first parking location based on the respective prior incidents associated with the first parking location;

determining a second score for a second parking location of the plurality of parking locations based on respective prior incidents associated with the second parking location; and in response to the second score indicating less risk than the first score, output a recommendation to park at the second parking location via the display screen.

19. The vehicle parking management system of claim 18, wherein the operations comprise determining one or more incentives for the second parking location and outputting an additional indication of the one or more incentives via the display screen.

20. The vehicle parking management system of claim 19, wherein the one or more incentives for the second parking location is based on the second score.

* * * * *